(12) United States Patent
Shao et al.

(10) Patent No.: US 8,514,381 B2
(45) Date of Patent: Aug. 20, 2013

(54) OPTICAL FIBER NETWORK TEST METHOD OF AN OPTICAL FREQUENCY DOMAIN REFLECTOMETER

(75) Inventors: Shou-kuo Shao, Taoyuan County (TW); Chih-yih Wang, Taoyuan County (TW); Yu-jen Hsu, Taoyuan County (TW); Chia-hsien Wu, Taoyuan County (TW); Fwu-yuan Tsai, Taoyuan County (TW)

(73) Assignee: Chunghwa Telecom Co., Ltd., Taoyuan County (TW)

( * ) Notice: Subject to any disclaimer, the term of this patent is extended or adjusted under 35 U.S.C. 154(b) by 0 days.

(21) Appl. No.: 13/402,176

(22) Filed: Feb. 22, 2012

(65) Prior Publication Data
US 2013/0077088 A1 Mar. 28, 2013

(30) Foreign Application Priority Data
Sep. 27, 2011 (TW) .............................. 100134720 A

(51) Int. Cl.
*G01N 21/00* (2006.01)
(52) U.S. Cl.
USPC ....................................................... 356/73.1
(58) Field of Classification Search
USPC ........................................................ 356/73.1
See application file for complete search history.

(56) References Cited

U.S. PATENT DOCUMENTS

| | | | |
|---|---|---|---|
| 6,008,487 A * | 12/1999 | Tachikawa et al. | 250/227.14 |
| 7,301,612 B2 * | 11/2007 | Weaver | 356/73.1 |
| 2011/0217036 A1 * | 9/2011 | Campanelli et al. | 398/13 |

* cited by examiner

*Primary Examiner* — Tu Nguyen
(74) *Attorney, Agent, or Firm* — WPAT, P.C.; Anthony King

(57) ABSTRACT

An optical fiber network test method of an optical frequency domain reflectometer, which is to use the optical testing apparatus and method of the prevent invention to combine the characters of filtering, reflecting and transmission of light of the wave reflecting unit, applying on any optical fiber test or point-to-point or point-to-multipoint optical fiber network. Thus, the optical fiber testing apprartus and method is constructed, and the goals of achieving the optical fiber network test method of the optical frequency domain reflectometer or confirming simultaneously the position of the barrier router and the barrier optical fiber connection point/end point/start point can be accomplished.

5 Claims, 3 Drawing Sheets

OPTICAL FIBER NETWORK TEST METHOD OF AN OPTICAL FREQUENCY DOMAIN REFLECTOMETER

BACKGROUND OF THE INVENTION

1. Field of the Invention

The present invention is an optical fiber network test method of an optical frequency domain reflectometer, which is easy to use with high efficiency and applied on any optical fiber test method of the optical frequency domain reflectometer or any optical fiber test or point-to-point or point-to-multipoint passive optical network.

2. Description of the Prior Art

With the rapid global internet growing, the traditional network could not afford the need of high-speed information transmission due to the communication revolution. The industrial technology maturation and diversified application products of optical-electro products timely supply the best solution for the huge bandwidths requirement of rapidly-growing global internet, high-quality multimedia networks, and a variety of data communications. Therefore, many types of optical communication network forums appear one after another, wherein the optical fiber is gradually accepted with great amount. In response to the great amount of usage and required services, the invention of convenient test and monitor method of optical fiber for such special network forum is truly needed.

Processing the test/monitor of the optical fiber has been a difficult question due to the framework design of the optical fiber. There was a monitor method which is using Optical Time Domain Reflectometer (OTDR), but such test method takes a lot of time, therefore it becomes a huge flaw on effectiveness. It is obvious that there are still many flaws on the conventional invention mentioned above, which is really not designed well and extremely needed to be improved. Comparing to the traditional test/monitor method by optical power or Optical Time Domain Reflectometer, the present invention provides a simpler, more effective and cheaper test method.

Based on the flaws on the conventional invention mentioned above, the inventor of the present invention was eager to proceed with improvement and innovation. After many years of earnest researches, the inventor successfully finished this optical fiber network test/monitor method of an optical frequency domain reflectometer.

SUMMARY OF THE INVENTION

The present invention is an optical fiber network test method of an optical frequency domain reflectometer. When the service system has problem, it is possible to test/monitor whether the optical fiber is disconnected, optical reflection or too much optical loss vale in a generation room. To clarify where the question is: is it on service system, optical router or connector? Show the right positions of optical fiber barrier and connector to lower the cost of maintenance sand operation.

To Achieve the above mentioned invention of the optical fiber network test method of the optical frequency domain reflectometer, which is to use a optical fiber test and measure apparatus to test/monitor the quantity of optical power reflected by the optical fiber and is the way to measure the distance of I-OFMCW (Incoherent-Optical Frequency-Modulated Continuous-Wave). Thus, we can simultaneously confirm the positions of optical events such as barrier router and connector. The method is to use the test distance of testing or monitoring the quantity of optical power reflected by the optical fiber and is the way to measure the distance of I-OFMCW (Incoherent-Optical Frequency-Modulated Continuous-Wave), analyze these data gradually to determine the latest status of the optical fiber. When it occurs barrier events such disconnection or deterioration on optical fiber or connector, the present invention can quickly analyzes a solution and provides a basis for the following alert and handling.

The present invention is an optical fiber network test method of an optical frequency domain reflectometer, which possesses the following advantages comparing to the other conventional inventions:

1. The present invent may test/monitor the optical fiber in a generation room through the reflection of the router's end (optical fiber's cross-section or optical fiber's connector opening) or equip a wave reflector monitor, such provides a feasible, reliable and effective test/monitor method of the optical fiber.
2. There is no near blind area of the optical fiber measurement of the present invention; and the blind area of event is also small, which is helpful for the optical fiber router reflection testing.
3. The present invention provides both methods for I-OFMCW optical fiber test method, and point-to-point or point-to-multipoint (such as: Passive Optical Network, PON) the latest status testing method. Through these methods, the goal of quick and massive monitor is adapted to be achieved, and the test of router barrier position and the test of low speed are adapted to be solved.
4. The present invention provides an single-ending and long-term automatically optical fiber network test/monitor, which the present invention provides a better service quality through quickly and correctly clarifying the barrier events on service system or optical fiber router, and processing the preventive maintenance for the latest status.
5. The present invention may not only lower the network maintenance cost of human affairs, but also ensure the reliability and stability of optical fiber network, thus upgrade the maintenance efficiency. The economic benefit is very obvious.

BRIEF DESCRIPTION OF THE DRAWINGS

Please refer to the detailed description and the drawings of the present invention, which can further understand the technical contents and the goal effects of the present invention; the drawings comprising as follow.

DETAILED DESCRIPTION OF THE PREFERRED EMBODIMENT

The present invention is an optical fiber network test method of an optical frequency domain reflectometer.

Figure 1:
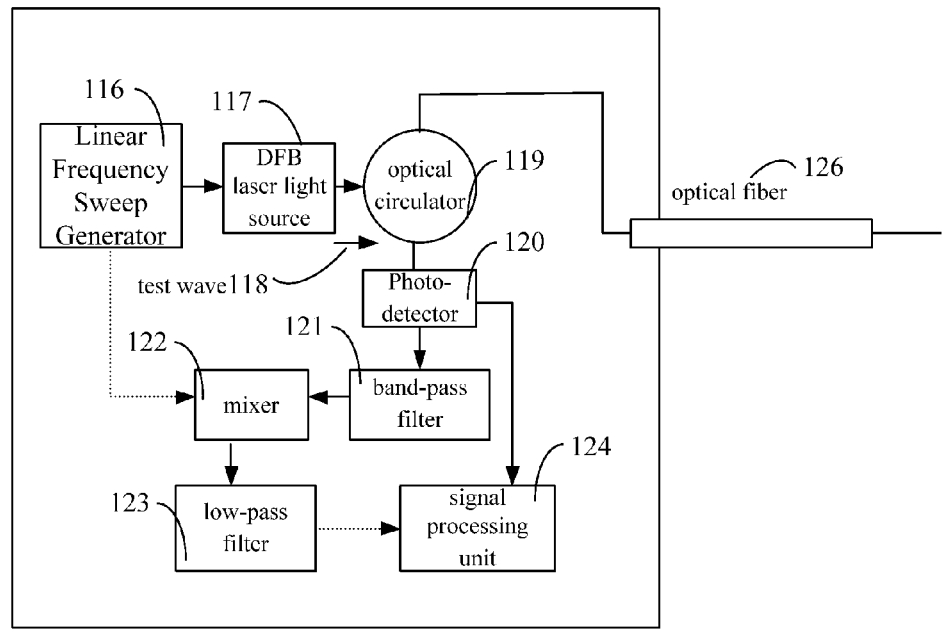
FIG. 1 is an architecture diagram of the optical fiber network monitor or test method of an optical frequency domain reflectometer of the present invention.
Figure 2:
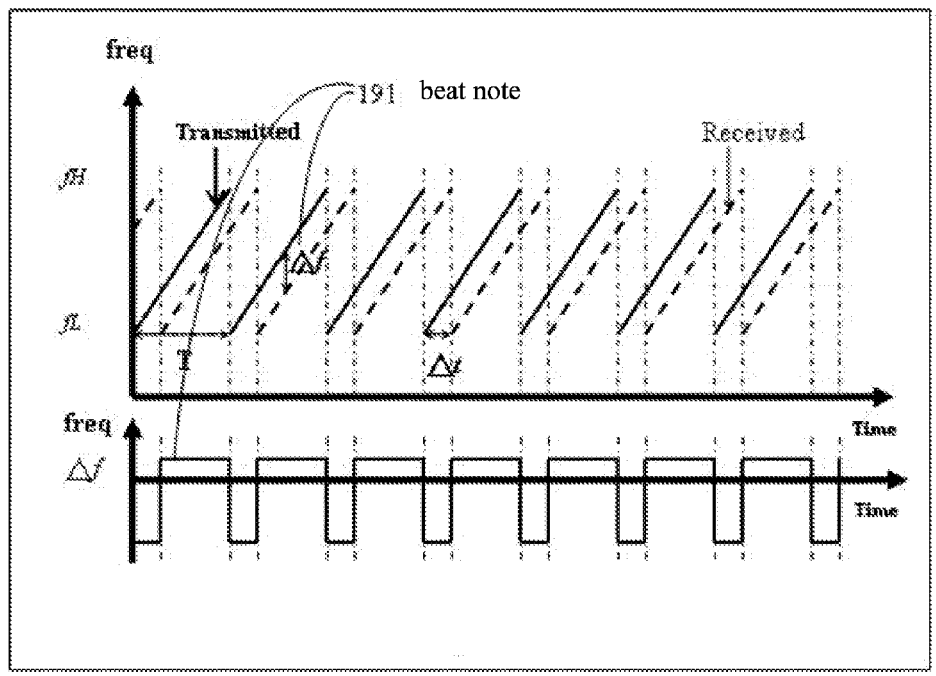
FIG. 2 is a schematic diagram, in which the operation principles of FMCW show the beat notes produced by the different routers.

Please refer to the FIGS. 1 and 2. FIG. 1 is an architecture diagram of the optical fiber network monitor or test method of an optical frequency domain reflectometer of the present invention; FIG. 2 is a schematic diagram, in which the operation principle of FMCW show the beat notes produced from the different distances. As the FIG. 1 shows, the test/monitor method processing is as follows: a linear frequency scanning signal producer 116 modulates a DFB laser light source 117 and the optical signal of monitoring wave 118 is adapted to be transmitted through an optical circulator 119, and the optical signal is adapted to be transmitted to the end of the optical cable routing through an optical cable 126. After being reflected by the optical fiber's cross-section, the monitoring wave is adapted to turn back along the original route, pass through the optical cable 126 and then enter into an optical circulator 119. A photodetector 120 is configured to be responsible for the transformation of the electro-optical signal and the test of wave-optical power examination. The photodetector 120 transmits the test value of the optical power to a signal processing unit 124, then transmits the electrical signal transformed by the electro-optical signal to a band-pass filter 121, thus the monitoring-required electrical signal is adpated to be filtered. FIG. 2 shows that the mixer 122 makes the reflected wave and transmitted wave FMCW produce beat note action; then a low-pass filter 123 filters out the high frequency noise, the signal processing unit 124 is configured to make the spectrum analysis to obtain the steady beat note and the optical power value. Analyze and calculate the beat note 191 and the reflected optical power value. If there are any other reflection events in the optical fiber router, we may know all the characteristics of reflection events in the optical fiber routers through testing the different frequency and the corresponding power value.

Figure 3:
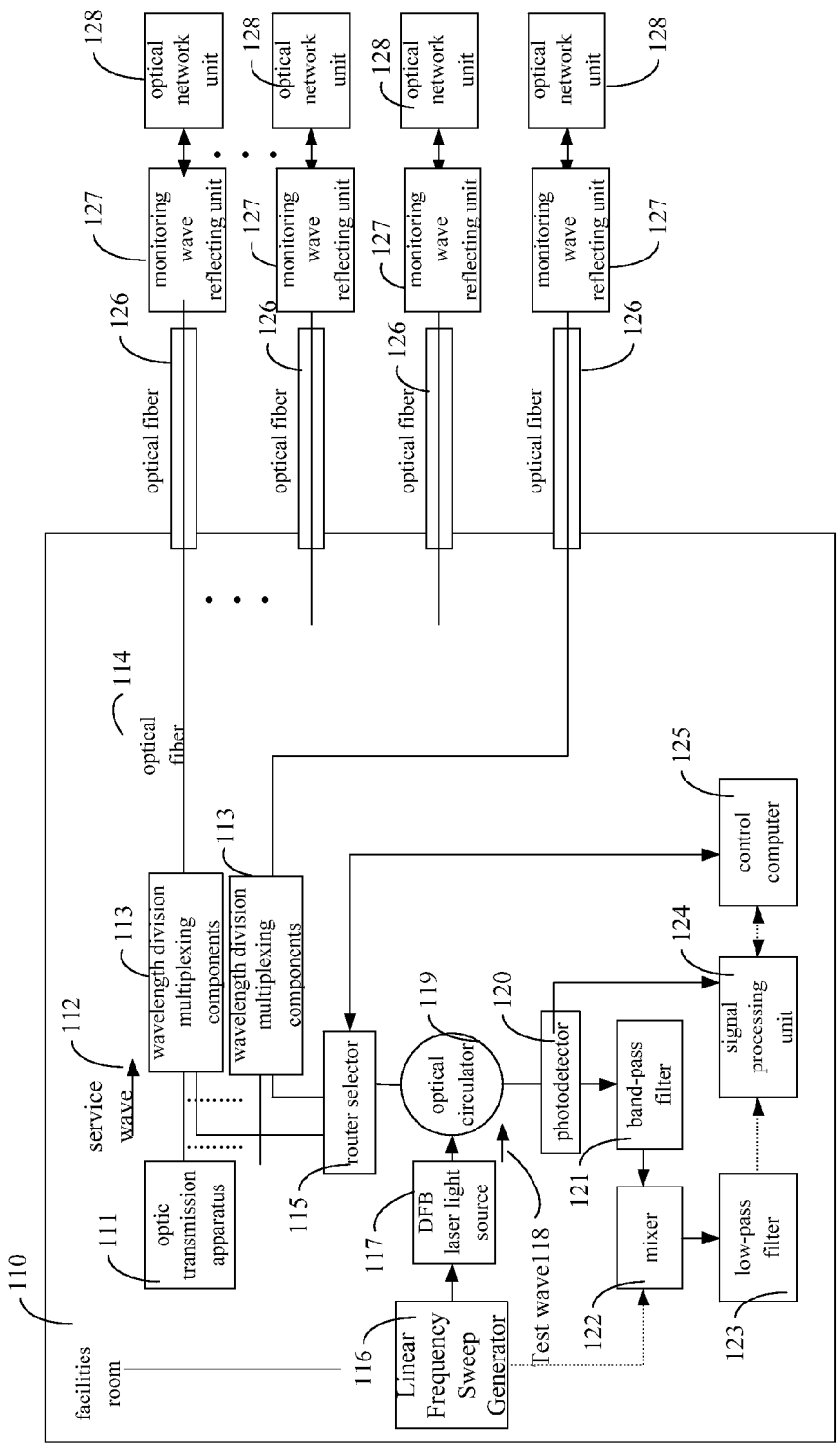
FIG. 3 is a diagram of point-to-point optical access router monitor method.

The optical fiber network test method of an optical frequency domain reflectometer is configured to be applied on the point-to-point optical access router monitor method shown in FIG. 3. The procedure of main monitored method is monitoring in the facilities room 110; an optic transmission apparatus 111 is configured to transmit the optical signal of the service wave 112 to the wavelength division multiplexing components 113. The processing method of monitor/test apparatus is a linear frequency scanning signal producer 116 modulates a DFB laser light source 117, and the optical signal of monitoring wave 118 is adapted to be transmitted through an optical circulator 119. A router selector 115 transmit the signal to the wavelength division multiplexing component 113, yet the wavelength division multiplexing component 113 integrates the service wave 112 and monitor wave 118 and then sends out the combined signal; before passing through the optical fiber 114, the optical cable out of the facilities room 126 to the ends of the routers, the optical signal is adapted to pass through the monitoring wave reflecting unit 127. Therefore, the service wave 112 may enter into optical network unit 128 by passing through the monitoring wave reflecting unit 127 and then provides user services. The monitoring wavelength is supposed to be reflected when the monitoring wavelength optical signal of the monitor wave 118 enter into the monitoring wave reflecting unit 127, wherein the specifications of the monitoring wave reflecting unit 127 in every router are all the same. The reflected monitor wave is supposed to turn back along the original route, pass through the optical cable 126, optical fiber 114 and then enter into the wavelength division multiplexing components 113 and passing through the optical router selector and the optical circulator 119. The photodetector 120 is adapted to be responsible for the transformation of the electro-optical signal and the test of wave-optical power examination. The photodetector 120 transmits the test value of the optical power to a signal processing unit 124, and then transmits the electrical signal transformed by the electro-optical signal to a band-pass filter 121, thus the monitoring-required electrical signal is supposed to be filtered. The mixer 122 makes the reflected wave and transmitted wave FMCW produce beat note action shown as FIG. 2; then the low-pass filter 123 filters out the high frequency noise, the signal processing unit 124 is supposed to make the spectrum analysis to obtain the steady beat note and the optical power value. A control computer 125 picks the beat note 191 and the reflected optical power value, and then gradually analyzes and calculates; thus the latest status of the whole optical fiber router is supposed to be obtained. When there is a bather on a point-to-point optical access, the optical power test value is supposed to be declined, meanwhile the beat note 191 is supposed to be changed. After analyzing and calculating comparably by the control computer 125, we may know that the distance of the occurred barrier point of the bather router, such provid a basis for the following alert and handling.

Figure 4:
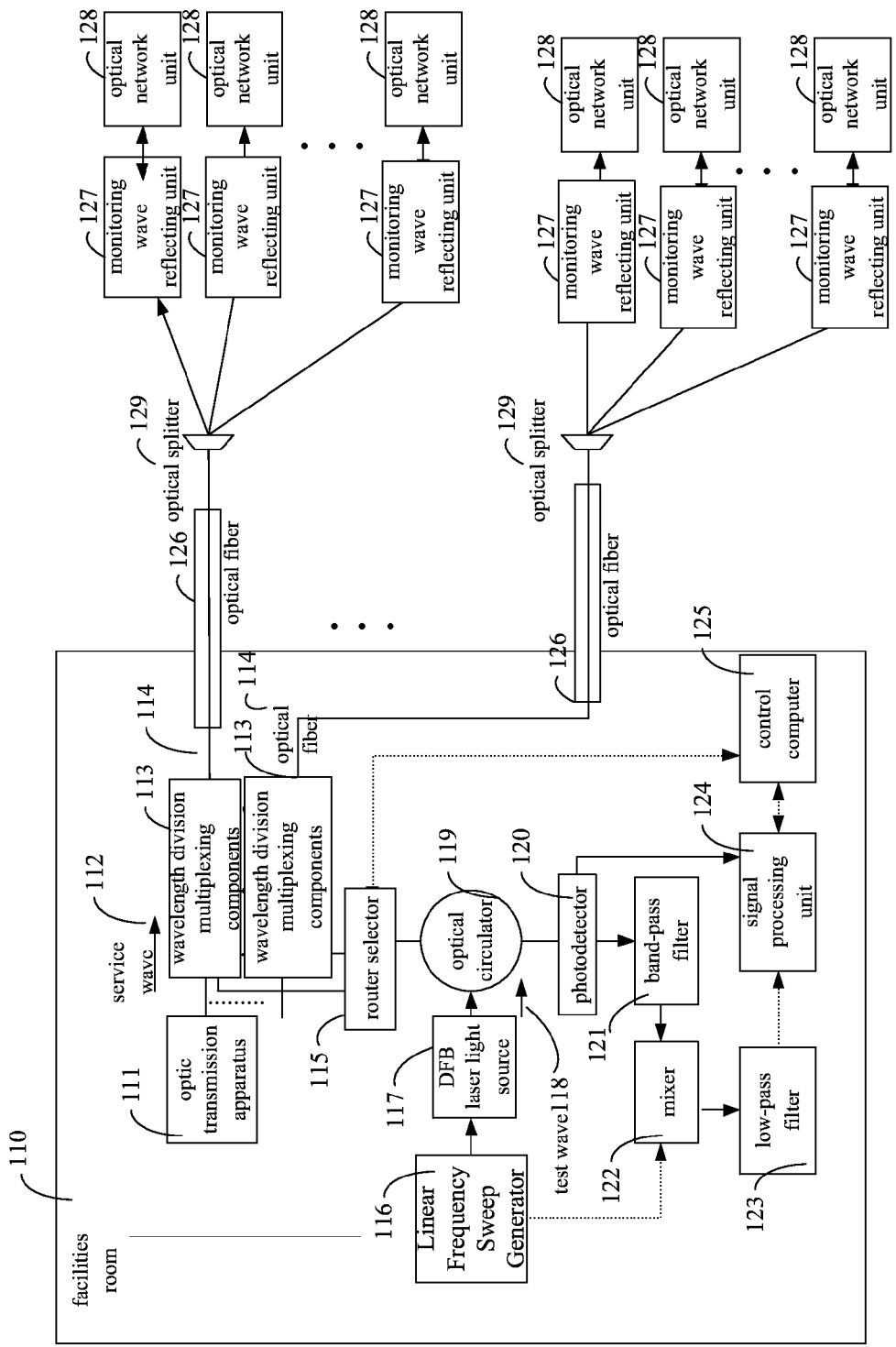
FIG. 4 is a diagram of point-to-multipoint passive optical fiber network monitor or test method of the optical frequency domain reflectometer.

The optical fiber network test method of an optical frequency domain reflectometer is adapted to be applied on the point-to-multipoint passive optical fiber network monitor method of an optical frequency domain reflectometer shown in FIG. 4. The procedure of main monitored method is monitoring in the in the facilities room 110; an optic transmission apparatus 111 is configured to transmit the optical signal of the service wave 112 to the wavelength division multiplexing component 113. The processing method of monitor apparatus is a linear frequency scanning signal producer 116 modulates a DFB laser light source 117, and the optical signal of monitor wave 118 is adapted to be transmitted through an optical circulator 119. A router selector 115 transmit the signal to the wavelength division multiplexing component 113, yet the wavelength division multiplexing component 113 integrates the service wave 112 and monitor wave 118 and then sends out the combined signal; before passing through the optical fiber 114, the optical cable out of the facilities room 126, and the optical splitter 129 of the routers to the ends of the routers, the optical signal is supposed to pass through the monitoring wave reflecting unit 127. Therefore, the service wave 112 may enter into optical network unit 128 by passing through the monitoring wave reflecting unit 127 and then provides user services. The monitoring wavelength is supposed to be reflected when the monitoring wavelength optical signal of the monitor wave 118 enter into the monitoring wave reflecting unit 127, wherein the specifications of the monitoring wave reflecting unit 127 in every splitter router are all the same. The reflected monitor wave is supposed to turn back along the original route, pass through the optical splitter 129, the optical cable 126, and optical fiber 114 and then enter into the wavelength division multiplexing components 113 and passing through the optical router selector and the optical circulator 119. The photodetector 120 is adapted to be responsible for the transformation of the electro-optical signal and the test of wave-optical power examination. The photodetector 120 transmits the test value of the optical power to a signal processing unit 124, and then transmits the electrical signal transformed by the electro-optical signal to a band-pass filter 121, thus the monitoring-required electrical signal is supposed to be filtered. The mixer 122 makes the reflected wave and transmitted wave FMCW produce beat note action shown as FIG. 2; then the low-pass filter 123 filters out the high frequency noise, the signal processing unit 124 is supposed to make the spectrum analysis to obtain the steady beat note and the optical power value. A control computer 125 picks the beat note 191 and the reflected optical power value, and then gradually analyzes and calculates. Because each distance between the splitter routers and the bureau ends are different, therefore each the reflected signal from the splitter to the bureau end and the signal transmitted by the bureau end are all different due to the time difference. By analyzing the different beat note signal and comparing the provisioning data of the optical fiber network, thus the latest status of the whole optical fiber router is supposed to be obtained. When there is a barrier on a splitter network, the optical power test value is supposed to be declined, meanwhile the beat note 191 is supposed to be changed. After analyzing and calculating comparably by the control computer 125, we may know that the distance of the occurred barrier point of the barrier router, such provide a basis for the following alert and handling.

The present invention is also could be expanding applied. As shown in the FIGS. 3 and 4, the prevent invention is configured to be connected with many wavelength division multiplexing components 113 and the optical network apparatus collocating with the optical channel selector (OCS) 115. Besides, through switching the different test procedures to change the optical routes, both the quantity of to-be-monitored optical networks and region are expanded, thus the operation efficiency of test apparatus is configured to be raised and the unit cost is configured to be reduced.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An optical fiber network test method of an optical frequency domain reflectometer (OFDR), wherein the method comprises:
    a linear frequency scanning signal producer, wherein the frequency modulation rate of the produced wavelength is continuously linear variation frequency modulation signal;
    a DFB laser light source, which the linear frequency scanning signal producer is to produce the wavelength of the signal of the DFB laser to modulate the light signal, thus produce the incoherent optical frequency modulated continuous wave (I-OFMCW) signal as the monitoring optical signal;
    an optical circulator, which the optical circulator transmits the monitoring optical signal of DFB laser light source into the optical selector, thus separates the light and accept the reflected monitoring optical signal;
    a photodetector, which the photodetector receives the reflected monitoring optical signal from the optical circulator into electrical signal and enlarges the electrical signal;
    a band-pass filter, which the band-pass filter filters the electrical signal received from the photodetector to get the monitoring-required the electrical, thus the noise is diminished and the feed through event of mixer is prevented;
    a mixer, which the mixer is the transmitted optical frequency modulated continuous wave signal and the reflected optical frequency modulated continuous wave signal examined by the photodetector;
    a low-pass filter, which the low-pass filter filters out the high frequency noise and the harmonic noise signal, meanwhile only the low frequency beat note monitoring signal is passed; and
    a signal processing unit, which the signal processing unit makes the spectrum analysis on the beat note monitoring signal filtered by the low-pass filter, thus the analysis results is used to control the computer's monitor and alert and calculate the breakingpoint;
    firstly setting an optical fiber network test method of the optical frequency domain reflectometer apparatus in a facilities room, and assembling a monitoring wave reflecting unit or let the optical fiber fracture reflects;
    then processing the optical fiber network test method of the optical frequency domain reflectometer in order by controlling the optical channel selector (OCS) switches into the to-be-tested optical channel, integrating the testing wave optical signal by the wavelength division multiplexing components into service wave optical signal, and then transmitting the optical signal into the to-be-tested optical fiber; next, the optical signal being transmitted by the splitter through the optical cable to the ends of the splitter router, entering into the testing/monitoring wave reflecting unit or letting the optical fiber fracture reflects;
    the testing wave reflecting unit only reflecting the testing/monitoring wave optical signal back to the facilities room; the photodetector in facilities room simultaneously accepting and measuring the intensity of the optical signal reflected from the optical fiber network, thus retriving the losses of the optical power of the optical fiber routers and the beat note signal of frequency modulated continuous wave signal;
    finally analyzing the loss of optical power to measure whether the optical fiber router is normal; analyzing the beat note signal of FMCW, measuring the length of the optical fiber and the optical fiber which occurs error, thus the barrier event point may be detected quickly.

2. The optical fiber network test method of the optical frequency domain reflectometer of claim 1, comprising an optical channel selector (OCS) connecting with many wavelength division multiplexing components, accessing to the network through switching the optical channel selector, wherein a monitoring apparatus and method are configured to monitor many optical access networks.

3. The optical fiber network test method of the optical frequency domain reflectometer of claim 1, wherein the measuring the optical routers comprises:
    measuring whether a router's testing wave optical power declines, which is a router barrier event;
    measuring whether a router's testing wave optical power is less than the default vale, which is an error of the router;
    measuring whether a router's testing wave optical power is close to the default vale, which the router is normal.

4. The optical fiber network test method of the optical frequency domain reflectometer of claim 1, wherein the barrier event point is detected by the optical fiber through mathematically calculating and analyzing the steady beat note signal produced by the transmitting and reflecting frequency modulated continuous wave signal.

5. The optical fiber network test method of the optical frequency domain reflectometer of claim 1, wherein the testing wave produced by the optical fiber barrier event testing apparatus is incoherent optical frequency modulated continuous wave (I-OFMCW) signal.

* * * * *